Aug. 28, 1945. T. J. WHITECHESTER 2,383,527
PROPELLER BLADE PITCH MEASURING DEVICE
Filed Sept. 2, 1943  2 Sheets—Sheet 1

INVENTOR
Thomas J. Whitechester,
BY
ATTORNEY

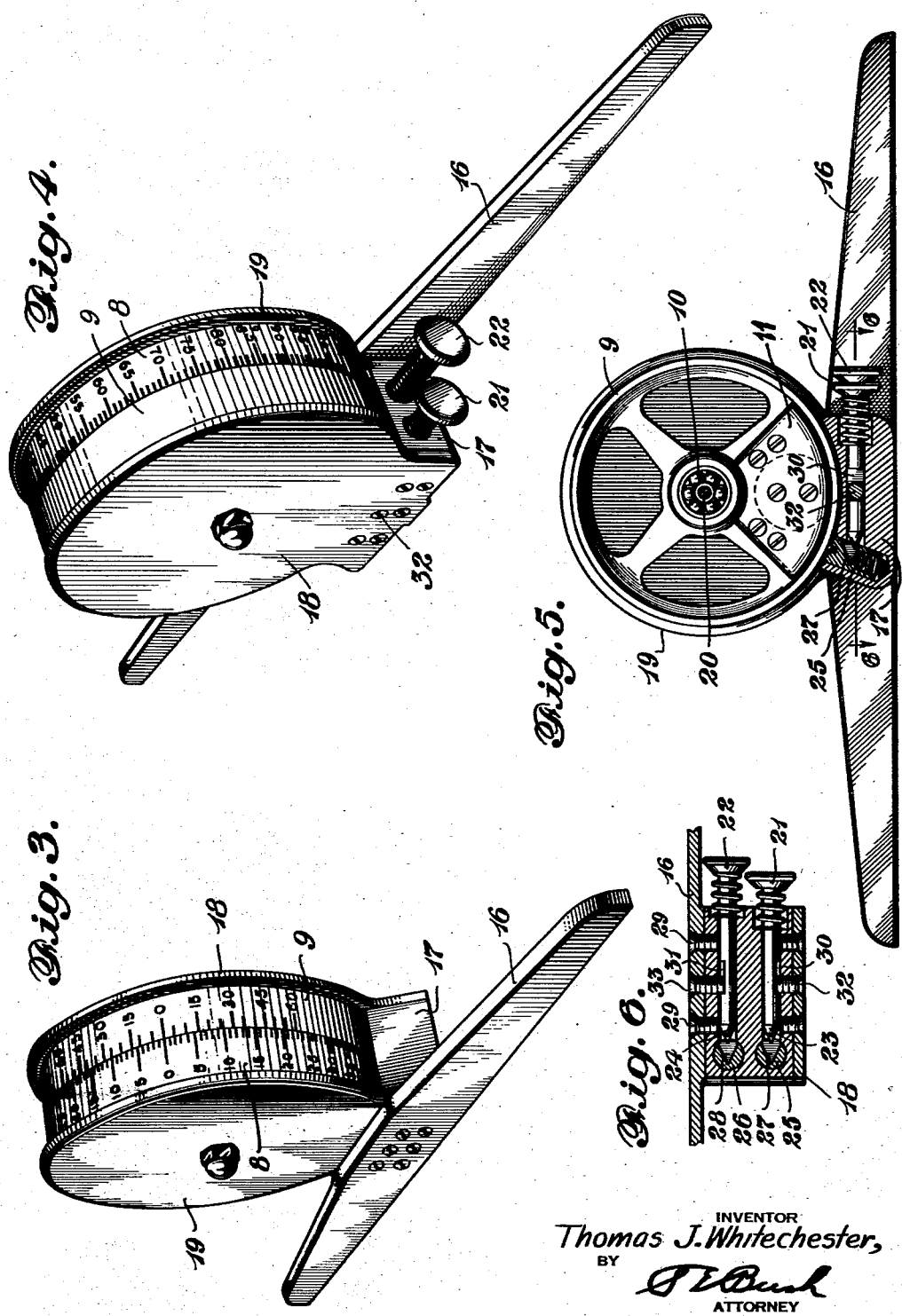

Patented Aug. 28, 1945

2,383,527

UNITED STATES PATENT OFFICE 2,383,527

PROPELLER BLADE PITCH MEASURING DEVICE

Thomas J. Whitechester, United States Navy

Application September 2, 1943, Serial No. 500,897

7 Claims. (Cl. 33—215)

(Granted under the act of March 3, 1883, as amended April 30, 1928; 370 O. G. 757)

This invention has reference to propeller blade pitch measuring devices for propeller blades mounted on air craft or other vehicles.

It is frequently necessary in airplane factories and on the flying field, to check the pitch of propeller blades, especially in the variable-pitch type of propellers. This job has heretofore been somewhat tedious and often involved, necessitating the use of spirit levels, sighting instruments, complicated calculations and sometime requiring the levelling of the propeller shaft preliminary to making the measurements. These operations consumed a great deal of time and introduced the possibilities of cumulative errors, causing inaccurate results.

The object of the present invention is to produce a simple instrument whereby the measurement of the pitch of a propeller blade may be made quickly and accurately without involving any calculations, and without the necessity of accurately levelling the propeller shaft.

A further object is to construct an instrument whereby to obtain the blade-angle by reading directly in degrees and minutes on a circumferential scale adjusted by gravity and locked in position with a reference edge of the instrument against a reference surface on the blade when the blade is horizontal on one side of the propeller shaft, said reading being opposite an index on an adjacent circumferential scale adjusted by gravity and locked in position with the reference edge of the instrument against the same reference surface of the blade when the blade is horizontal on the other side of the propeller shaft approximately 180° from its first position.

A further object is to devise a simple method of measuring the attitude of the blade surface at any distance from the hub when the blade is turned into a horizontal position, then measuring the attitude of the blade at the same point when the blade is turned into a horizontal position on the other side of the shaft and automatically dividing the angular difference between these attitudes by two to get the pitch angle of the blade at that point.

Figure 1:
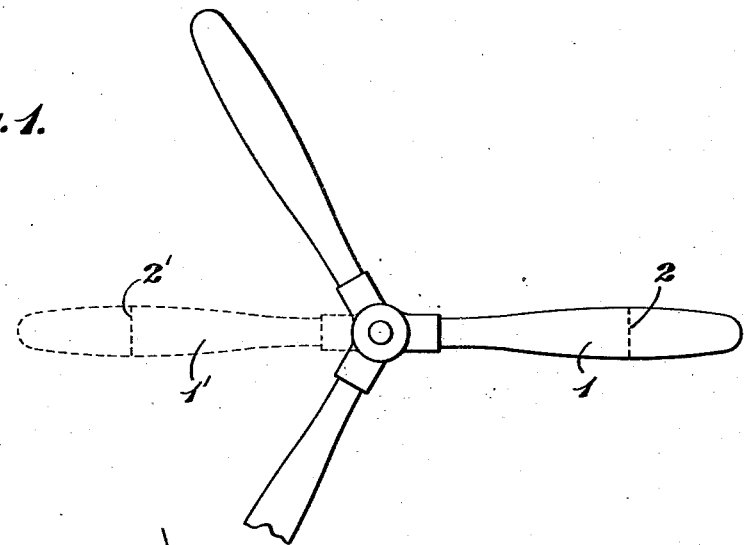
Figure 2:
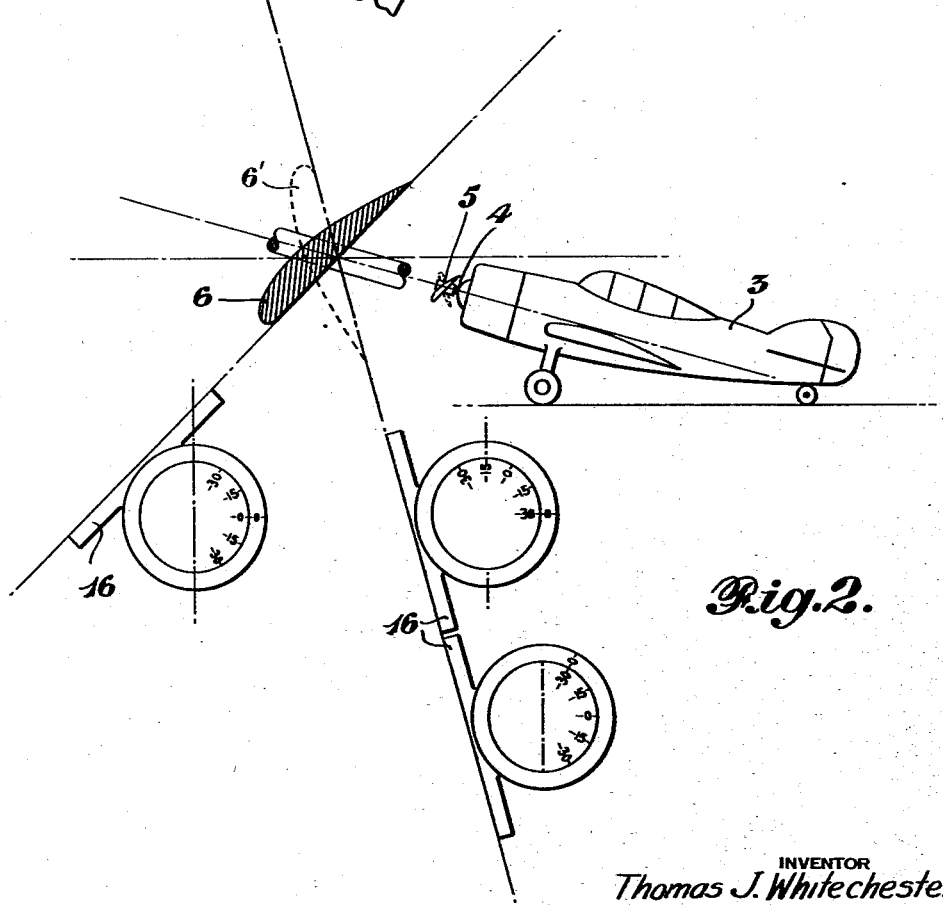

These and other objects will become more apparent when the preferred form of the device of the present invention is hereinafter defined in detail, with reference to the accompanying drawings, in which:

Figure 1 shows a sample propeller indicating the 180° spaced horizontal positions to which a blade is turned, and a common station thereon, at which the instrument's reference edge is located for each of the two positions of the blade, where the measurements are made in the course of the present method, Figure 2 illustrates the method of using a preferred form of the instrument devised for measuring the pitch of a blade of a propeller mounted in a plane while the plane is resting in a normal attitude on the ground, Figure 3 is a perspective view of a preferred form of the instrument of this invention, Figure 4 is a perspective view of the same instrument as viewed from the opposite side, Figure 5 is a sectional view of the instrument showing one of the two calibrated scale elements weighted on one side, and the releasing mechanism for each scale, and Figure 6 is a section through the releasing assembly taken at 6—6 in Figure 5.

Similar parts of the device are designated by the same numerals in the several views of the drawings.

In Figure 1, a three bladed propeller is shown having one of the blades in a horizontal position with a station 2 indicated in dotted lines thereon where one of the readings is taken with the present instrument. This blade is also shown in dotted lines in the opposite horizontal position at which the other reading is taken.

In Figure 2, airplane 3 is shown in a normal position on the ground and the propeller shaft 4 is inclined at an angle to the ground. The two-bladed propeller 5 is shown in a horizontal position, and enlarged cross-sections of one of the blades at its measuring station is shown in opposite horizontal positions, 6 and 6', where measurements are taken with the device of the present invention.

Figures 3 and 4 are reverse perspective views showing the general construction of my device.

Figure 5 is a vertical sectional view of the instrument showing one of the face members 9 with a weight 11 thereon and a brake-shoe 25 spring-pressed against this member. The shoe has a detent 27 through which the end 23 of a slidable pin moves in response to depression of the button 21 for withdrawing the shoe from engagement with the face member 9.

Figure 6 is a cross section through the brake-shoe releasing means for both face members taken on the line 6—6 of Figure 5. The device consists of a straight edge 16 mounted on a frame 17 which has a pair of side members 18 and 19 embracing two circular face members 8 and 9 rotatably mounted on a non-friction bearing 10, which bearing operates on a shaft 20 having its ends fixed in the side members 18 and 19. The brake-shoe mechanism is in the frame adjacent the straight edge member 16 and consists of two spring released pins with push buttons 21 and 22. The ends of the pins are conically formed at 23 and 24 and actuate brake-shoes 25 and 26 respectively. The brake-shoes have detents 27 and 28 into which the conical ends of the pins are moved for withdrawing the brake-shoes away from the face members 8 and 9 against the pressure of the corresponding springs.

The straight edge 16 is fastened to the frame 17 by means of screws 29, 29. The pins 21 and 22 have grooves 30 and 31 into which set screws 32 and 33 are fitted to retain them within the frame when not being depressed. The face members are loaded with weights 11 so that either of them may respond to the force of gravity and assume a normal position in any position of the straight edge, whenever the member is released for free rotation by the depression of the corresponding pin. The face members 8 and 9 have cylindrical surfaces which are provided with scales on their outer surfaces, face member 8 having a scale of divisions two degress apart starting with zero and marked off at 5 division intervals in each direction therefrom. On the outer surface of face member 9 a vernier scale is marked off from zero to 60 minutes in each direction in 15 minute intervals, each 15 minute interval being subdivided into three divisions representing 5 minutes each. These scales are so related that when both members are released simultaneously their zero marks will register. When a reading of the angle between the members is being taken, if the zero mark on the scale of member 9 does not fall directly on one of the degree marks on the other scale, the fraction of a degree may be read in minutes on the vernier scale opposite the mark on this scale which registers more closely than any other with a division mark on the other scale. The division marks on the scale of face member 8 are spaced two degrees apart but are marked with numerals corresponding to the number of divisions which they are spaced from the zero mark. This is done for a purpose to be hereinafter more fully explained.

The operation of my device is as follows: The propeller blade, the pitch of which is to be measured, is turned on its shaft into a horizontal position regardless of the angle at which its shaft may be inclined relative to the ground. A station is selected on the blade where its pitch angle is to be measured. The straight edge of my device is then placed on this station. Pin 21 is then depressed to release the face member 9 and permit it to assume a normal position in response to gravity. The pin 21 is then released so that this face member is locked with respect to the straight edge. The device is then removed and the propeller blade turned 180 degrees to a horizontal position on the opposite side of its shaft. The straight edge is then again placed on the same station as before on the propeller blade. It is immaterial which way the straight edge is applied since the scales are marked off in both directions from their origins. This time the pin 22 is depressed to release the face member 8 and to permit it to assume its normal position relative to the ground. The pin 22 is then released to lock face member 8 in this position. The pitch of the propeller blade is then read on the scale of face member 8 opposite the zero mark of face member 9, the number of degrees being read on the scale of face member 8 and the additional number of minutes on the scale of face member 9. In the first step of the operation above described, when the straight edge was placed on the proper station of the propeller blade while the latter was in its horizontal position on one side of the shaft, the angle made by the straight edge with the vertical was equal to the sum of the pitch angle of the propeller blade and the angle of inclination of the propeller shaft to the ground, as may be readily seen by reference to Figure 2. This angle was registered by permitting face member 8 to assume a normal position when the straight edge was held against the propeller blade in this position. The angle registered by the face member 9, upon its release, with the device against the propeller blade in its horizontal position 180° away from the first position was equal to the pitch angle of the propeller blade minus the angle made by its shaft with the ground. Thus the difference between these two angles as registered between two face members, being the difference between the above two angles, is equal to twice the pitch angle. However, the scale of degrees being marked off in two degree units instead of one degree as would normally be shown on a scale of degrees, the reading shows the pitch angle directly, so that no calculations are necessary.

Since the scales are marked off in both directions around the cylindrical surfaces of the members 8 and 9 from their zero marks, it is obvious that either of the members may be used to register the pitch angle at one side of the propeller shaft, so long as the other one is used for the other side. The resulting reading will always indicate the pitch angle in degrees and minutes. Referring to Fig. 2, if it is assumed that in the first position, both elements were released to take their normal positions as shown in the figure at the left, then in the second position, either of the pins may be depressed to get the reading of the pitch angle, since the same result would obtain. The device shown in duplicate along the line of the propeller blade surface at the right in the figure, shows the result of depressing one of the pins in one of these duplicate outlines, whereas the result of depressing the other pin is seen in the other outline. The readings are the same in either case, although they are on opposite sides of the degree scale. Thus it is apparent that the present device provides a quick means of ascertaining the pitch angle of any propeller blade without requiring any accessory apparatus to level the propeller shaft or to locate the blade in any exact attitude. No complicated geometrical instruments are necessary to measure the pitch angle. My device is simple and easily handled yet gives very accurate readings. It requires no calculations.

Obviously, the scales marked off from zero in one direction might be eliminated and only the other set of scales used to get the readings. This would determine which scale is to be released for each position of the propeller blade, but would eliminate any chances of confusion in readings in cases where the angle was close to 90° where the scales on member 8 would overlap each other if they were marked off in both directions from the zero mark so as to read beyond the 90° mark in each direction, as may be seen in Fig. 4.

Various methods may be used to lock and to release the face members and to level these members without departing from the scope of this invention. As an example, in place of the weights, a spirit level may be used to determine the normal position of each of the face members. Other ways of assembling the device and other forms of the elements may also be designed to suit particular requirements.

This invention may be manufactured or used by or for the Government of the United States for governmental purposes without the payment to me of any royalty thereon or therefor.

What is claimed is:

1. A device for measuring the pitch angle of a propeller blade comprising a straight edge, two adjacent rotatable eccentrically weighted members mounted at one side of said straight edge and having adjacent annular scales, one scale being a degree scale on which two-degree intervals are marked off as units, the other scale being a vernier scale to read fractional units and releasable brake means for each of said members.

2. A straight edge, a device for measuring the pitch angle of a propeller blade comprising a frame attached to one side thereof, having a pair of eccentrically weighted members mounted on a common shaft for free rotation therein, one of said members having an annular scale marked off in two-degree units from a zero index in both directions, a vernier on the other member having its zero index in register with the zero on the scale when said members hang freely in a vertical position, releasable brake means for normally locking each of said members, and means for manually releasing either brake means individually.

3. A frame having a straight edge and a shaft on which a pair of eccentrically weighted members are mounted for free rotation, a circumferential scale of two degree divisions on one of said members marked off from zero at the origin in both directions to 90 at the point diametrically opposite the origin, a reference point on the other member adjacent this scale, and releasable brake means for each of said members.

4. A frame having a straight edge and a shaft on which a pair of eccentrically weighted members are mounted for free rotation, a circumferential scale of two degree divisions on one of said members marked off from zero at the origin in both directions to 90 at the point diametrically opposite to the origin, a reference point and vernier scale to each side of said point on the other member adjacent this scale for reading sixtieths of the divisions of the latter scale, the origin and point being located so that they register when the centers of gravity of the two members are lined up radially with respect to the shaft, and manually releasable brake means for normally locking each of said members against rotary displacement.

5. In a device for measuring the pitch angle of a propeller blade, a pair of adjacent rotary eccentrically weighted circumferential scales mounted in a frame having a straight edge, one scale being marked off from zero in both directions with two-degree units, the other having an index registering with the zero when the weights are lined up, and releasable brake means for normally preventing rotation of each of said scales.

6. In a device for measuring the pitch angle of a propeller blade, a frame having a straight edge and a shaft on which a pair of members provided with level indicating means are mounted for free rotation, a circumferential scale of two degree divisions on one of said members marked off from zero at the origin in both directions to 90 at the point diametrically opposite the origin, a reference point on the other member adjacent this scale, and means for adjustably setting each of said members to a normal level position about their axis.

7. In a device for measuring the pitch angle of a propeller blade, a frame having a straight edge and a shaft on which a pair of members provided with level indicating means are mounted for free rotation, a circumferential scale of two degree divisions on one of said members marked off from zero at the origin in both directions to 90 at the point diametrically opposite the origin, a reference point and vernier scale to each side of said point on the other member adjacent this scale for reading sixtieths of the divisions of the latter scale, the origin and point being located so that they register when the level indicating means on both members are lined up radially with respect to the shaft, and means for adjustably setting each of said members to a normal level position about their axis.

THOMAS J. WHITECHESTER.